United States Patent Office 3,745,137
Patented July 10, 1973

3,745,137
PROCESS OF PREPARING NONAQUEOUS DISPERSIONS OF THERMOSETTING COPOLYMERS
Carroll Glenn Reid, Louisville, Darrell D. Hicks, Jeffersontown, and Charles David Green, Louisville, Ky., assignors to Celanese Coatings Company, New York, N.Y.
No Drawing. Filed Oct. 26, 1971, Ser. No. 192,643
Int. Cl. C08f 45/28, 47/20; C08g 53/18
U.S. Cl. 260—33.6 UA
13 Claims

ABSTRACT OF THE DISCLOSURE

Nonaqueous dispersions of copolymers of (1) at least one ethylenically-unsaturated monomer, (2) a hydroxyalkyl ester of an unsaturated aliphatic monocarboxylic acid, and (3) a different hydroxy-containing ethylenically unsaturated monomer, which dispersions are stable per se and in the presence of aminoplast resins and solutions thereof, and the copolymers are internally compatible. The dispersions are prepared by the process which comprises first partially polymerzing a portion of at least one of the hydroxy-free and carboxy-free monomers with all of the different hydroxy-containing ethylenically unsaturated monomer, followed by adding all of the remaining monomers and holding to essentially complete conversion. The dispersions are useful in coating compositions.

BACKGROUND OF THE INVENTION

This invention relates to nonaqueous dispersions of hydroxy-containing copolymers. More particularly, this invention relates to nonaqueous dispersions of hydroxy-containing copolymers, which dispersions are stable per se and in the presence of aminoplast resins and solutions thereof and said copolymers are compatible internally.

Described in U.S. Reissue Pat. 27,151 are carboxyhydroxy-containing copolymers which, when combined with aminoplast resins, are especially useful in the preparation of industrial finishes. Because the carboxy-hydroxy copolymers are in solution, such industrial finishes usually are applied to a substrate by means of dipping, spraying, roller coating, and the like. However, because the disclosed copolymer solutions have relatively high solution viscosities at solids contents of from about 40 weight percent to about 60 weight percent, they cannot be applied by production line spray techniques without substantial dilution with volatile organic solvents.

In the past, polymer solution viscosity problems have been overcome by dispersing the polymer in an organic liquid, i.e., nonaqueous, medium. As a general rule, a precursor or stabilizer, usually a polymeric material which is soluble in the nonaqueous medium, is required in order to impart stability to the resultant dispersion. As used herein, the terms "stability" and "stable" refer to the long-term ability of the minute polymer particles constituting the dispersed phase to remain suspended in the nonaqueous medium, separate and distinct from one another. Typical of the prior art stabilization of nonaqueous dispersions are U.S. 3,095,388, U.S. 3,232,903, U.S. 3,365,414, and Canadian Patent 859,824. According to U.S. 3,095,388, a stable dispersion of acrylic polymer in organic liquid may be prepared by polymerising at least one monomer selected from the group consisting of acrylic acid and methacrylic acid, and lower esters, amides, and nitriles thereof, in an inert, relatively non-polar organic liquid in which the polymer is insoluble, the liquid containing a catalyst for the polymerization of said monomer and a member of the group consisting of organic block and graft copolymers, of which one constituent is rubber which is soluble in said organic liquid and another constituent is insoluble in the organic liquid and compatible with the polymer being formed. U.S. 3,232,903 teaches that polymerizable and copolymerizable ethylenically-unsaturated monomers are polymerized to form addition polymers of either linear or cross-linked type in a hydrocarbon solvent medium containing a dispersing agent of polymeric character which also is of essentially hydrophobic nature, wherein the polymeric precursors adapted to form the polymeric dispersing agents include hydrocarbon-soluble acrylic polymers and various modified or oxidized vegetable oils. Disclosed in U.S. 3,365,414 is a process for obtaining a stable polymer dispersion or organosol which comprises copolymerizing (1) a vinyl monomer which is free from functional hydroxy and carboxy groups and (2) an acrylic or methacrylic monomer containing a functional hydroxy and/or carboxy group, in the presence of (3) a solution of an alkylated melamine-formaldehyde reaction product dissolved in an essentially aliphatic hydrocarbon in which the copolymer of components (1) and (2) is insoluble. Canadian Pat. 859,824 discloses a dispersant for use in dispersions in organic media, the dispersant comprising a solvatable addition polymer having attached thereto at least one group of the formula:

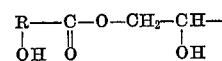

where R is an aliphatic radical.

Following such prior art teachings, it was possible to prepare stable nonaqueous dispersions of the carboxy-hydroxy-containing copolymers disclosed in U.S. Reissue Pat. 27,151. However, upon preparing films from such dispersions, without the use of a curing agent, cloudy or hazy films resulted. The condition was not ameliorated by the use of aminoplast resins as curing agents. Thus, although such dispersions appeared to be compatible with aminoplast resins, the copolymers from which said dispersions were prepared were not internally compatible. Omitting a stabilizer had no effect on compatibility and resulted in unstable dispersions. By internally incompatible, it is meant that portions of the copolymer molecules repel or reject other portions of copolymer molecules, giving rise to cloudiness or haziness in dried films.

SUMMARY OF THE INVENTION

It therefore is an object of the present invention to provide nonaqueous dispersions of hydroxy-containing copolymers which are stable.

It also is an object of the present invention to provide stable nonaqueous dispersions of hydroxy-containing copolymers which are compatible with aminoplast resins and solutions thereof.

Still another object is to provide stable nonaqueous dispersions of hydroxy-containing copolymers, which copolymers are internally compatible.

Yet another object is to provide a process for preparing stable nonaqueous dispersions of hydroxy-containing copolymers, which dispersions are stable in the presence of aminoplast resins, and solutions thereof, and which copolymers are internally compatible.

These and other objects will be readily apparent to those skilled in the art from a consideration of the specification and claims which follow.

In accordance with the present invention, internally-stabilized hydroxy-containing copolymers dispersed in a nonaqueous medium are provided, wherein the dispersed phase is a copolymer of (1) from five to 98 weight percent of at least one ethylenically-unsaturated monomer, (2) from one to 75 weight percent of a hydroxyalkyl ester of an unsaturated aliphatic monocarboxylic acid, and (3) from one to 20 weight percent of a different hydroxy-containing ethylenically-unsaturated monomer, the total of (1), (2), and (3) being 100 weight percent.

The nonaqueous medium, or dispersing phase, primarily is a liquid aliphatic hydrocarbon in which the dispersed phase is substantially insoluble. The nonaqueous medium can be a single compound or a mixture of two or more compounds. Furthermore, up to about 50 weight percent of aromatic hydrocarbons can be present. However, only small amount, i.e., less than about 20 weight percent, of polar solvents, such as aliphatic alcohols, esters, ethers, and ketones, can be employed.

The process by which the disclosed dispersions are prepared comprises first partially polymerizing, i.e., to a conversion ranging from about 60 to about 75 percent, from about 15 to about 80 weight percent of at least one of the hydroxy-free and carboxy-free monomers, the homopolymers of which are soluble in said nonaqueous medium, with all of the different hydroxy-containing ethylenically-unsaturated monomer, followed by adding all of the remaining monomers and holding to essentially complete conversion. Both steps are carried out in the presence of a catalytic amount of a free-radical initiator.

DETAILED DESCRIPTION OF THE INVENTION

In general, the suitable ethylenically unsaturated monomers are those which contain a single vinyl or vinylene group capable of undergoing addition polymerization to produce linear polymers. As used herein, the term "vinyl" is meant to include vinylene.

Particularly important vinyl monomers are vinyl aromatic compounds, such as styrene, α-methylstyrene, vinyltoluene, isopropenyltoluene, the various vinylxylenes, the various chlorophenylethylenes, the various bromophenylethylenes, the various fluorophenylethylenes, the various polyhalophenylethylenes, the various cyanophenylethylenes, vinylnaphthalene, and the like.

Other valuable monomers are saturated aliphatic esters of acrylic, methacrylic, and crotonic acids, wherein the ester moiety contains fewer than 21 carbon atoms. Examples of such esters include the methyl, ethyl, propyl, isopropyl, n-butyl, isobutyl, sec-butyl, tert-butyl, amyl, hexyl, heptyl, octyl, decyl, dodecyl, lauryl, and stearyl esters of acrylic, methacrylic, and crotonic acids, among others.

A particularly useful group of vinyl monomers consists of unsaturated aliphatic monocarboxylic acids such as acrylic acid, methacrylic acid, crotonic acid, and half-esters of maleic, itaconic, and fumaric acids wherein the ester moieties are saturated, aliphatic, and contain from one to about ten carbon atoms. Such monomers can be used at levels of up to ten weight percent or more. In fact, it is preferred that at least one such monomer be employed in the preparation of the dispersions of the present invention. When such monomers are utilized, it is preferred that the resultant dispersed copolymer have an acid value of from one to 31, which requires that the amounts of such monomers employed be in the range of from 0.15 to 4.0 weight percent, based on the total amount of all monomers. The most preferred range of acid values is from about 10 to about 20, and the preferred unsaturated aliphatic monocarboxylic acids are acrylic acid and methacrylic acid.

Of course, other known vinyl-containing monomers can be employed. Such monomers include vinyl cyanides of not more than four carbon atoms, such as acrylonitrile and methacrylonitrile. Also included are monovinyl ethers, such as ethyl vinyl ether, ethyl methallyl ether, butyl vinyl ether, methyl vinyl ether, and other similar ethers containing not more than 20 carbon atoms. Other monomers include unsaturated aliphatic esters of saturated monocarboxylic acids wherein the ester moieties contain a single vinyl group and the acids contain not more than 20 carbon atoms; examples include, among others, vinyl acetate, vinyl stearate, and the allyl, meth- allyl, and crotyl esters of propionic, butyric, and other acids.

While a single vinyl monomer as described hereinabove can be copolymerized with the remaining two types of monomers, it is preferred that at least two vinyl monomers be employed, one of which is an unsaturated aliphatic monocarboxylic acid. Most preferably, at least one unsaturated aliphatic monocarboxylic acid and at least two other vinyl monomers will be employed. A particularly desirable combination is one or more acrylic and/or methacrylic esters, styrene or vinyltoluene, and acrylic acid or methacrylic acid.

In preparing the dispersions of the present invention, a portion of the carboxy-free vinyl monomers is employed in the partial-polymerization step. However, it is not necessary that a portion of each carboxy-free vinyl monomer be involved in said step.

It is necessary, though, that the product of said partial polymerization be completely soluble in the nonaqueous medium or dispersing phase. In general, those vinyl monomers whose homopolymers are soluble in the nonaqueous medium can be employed in said partial polymerization. While vinyl monomers, such as acrylonitrile, whose homopolymers are insoluble can be employed in minor amounts, the use of such monomers is not preferred. Furthermore, the extent of use of such "insoluble" monomers is to a large extent dependent upon the total monomer composition of the partial polymerization step.

The amounts of vinyl monomers which can be employed can vary from five to 98 weight percent, based on the total amount of all monomers. This range is independent of the number of vinyl monomers employed.

The second component of the dispersed copolymers is a hydroxyalkyl ester of an unsaturated aliphatic monocarboxylic acid, the ester portion of which contains from two to four carbon atoms. The unsaturated aliphatic monocarboxylic acid is selected from the group consisting of acrylic acid, methacrylic acid, crotonic acid, and half-esters of maleic, itaconic, and fumaric acids wherein the ester moieties are saturated, aliphatic, and contain from one to four carbon atoms. The preferred acids are acrylic acid and methacrylic acid. Examples of usable esters include, among others, 2-hydroxyethyl acrylate, 2-hydroxyethyl methacrylate, 2-hydroxyethyl crotonate, 2-hydroxyethyl methyl maleate, 2-hydroxyethyl n-butyl itaconate, 2-hydroxypropyl acrylate, 2-hydroxypropyl methacrylate, 2-hydroxypropyl ethyl fumarate, 1-methyl-2-hydroxyethyl methacrylate, 3-hydroxypropyl isopropyl maleate, 3-hydroxy-n-butyl acrylate, and 4-hydroxy-n-butyl methyl fumarate. The use of mixtures of two or more esters is contemplated by the present invention. For example, commercially-available hydroxypropyl methacrylate is a mixture of 2-hydroxypropyl methacrylate and 1-methyl-2-hydroxyethyl methacrylate. Preferred esters are 2-hydroxyethyl acrylate, 2-hydroxyethyl, methacrylate, hydroxypropyl acrylate, and hydroxypropyl methacrylate.

This second component as described hereinabove can be present in an amount ranging from one to 75 weight percent, based on the total amount of all monomers. At levels below about one weight percent, the dispersed copolymer generally exhibits poor cure response. On the other hand, levels above about 75 weight percent contribute to dispersion instability. As well as unsatisfactory cured film properties.

The third component of the disclosed copolymers is a hydroxy-containing ethylenically-unsaturated monomer different from said second component as described hereinbefore. In general, the third component can be represented by the following general formula:

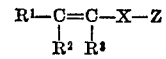

wherein $R^1$ is a monovalent radical selected from the group consisting of hydrogen, methyl, alkoxycarbonyl and hydroxyalkoxycarbonyl, the alkyl portions of which are saturated and contain from one, or two if hydroxy-substituted, to about 20 carbon atoms, amido, i.e.,

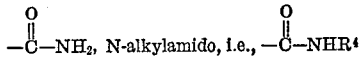

wherein $R^4$ is unsubstituted or hydroxy-substituted saturated aliphatic and contains from one to about 20 carbon atoms, and N,N-dialkylamido, i.e.,

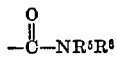

where $R^5$ and $R^6$ independently are unsubstituted or hydroxy-substituted saturated aliphatic and the total number of carbon atoms contained in both $R^5$ and $R^6$ is from two to about 20; $R^2$ and $R^3$ independently are either hydrogen or methyl; at least two of $R^1$, $R^2$, and $R^3$ are hydrogen; X is a divalent radical selected from the group consisting of methylenoxy, i.e., carbonyloxy, i.e.,

—CH$_2$O—, i.e.,

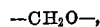

oxycarbonyl, i.e.,

carbonylimino, i.e.,

and carbonyl(alkylimino), i.e.,

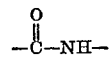

wherein $R^7$ is saturated aliphatic and contains from one to about 20 carbon atoms; Z is a monovalent radical selected from the group consisting of radicals represented by the following general formulae, except that when X is oxycarbonyl, Z shall be —$R^8$:

wherein $R^8$, $R^9$, and $R^{11}$ independently are hydroxyalkyl containing from two to about 20 carbon atoms, and $R^{10}$ and $R^{12}$ independently are alkyl containing from one to about 20 carbon atoms; and the total number of carbon atoms present in any given monomer is in the range of from 11 to about 24.

Monomers suitable for use as said fourth component include, among others, the following:

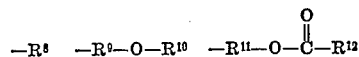

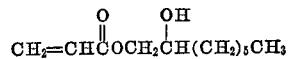

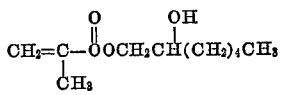

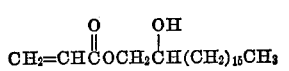

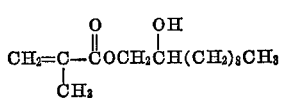

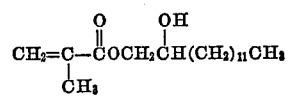

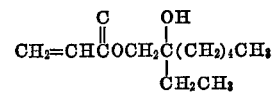

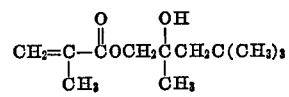

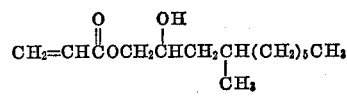

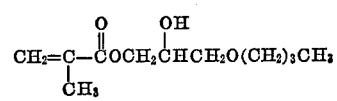

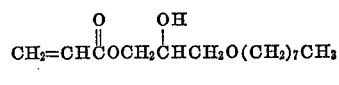

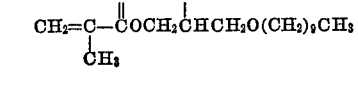

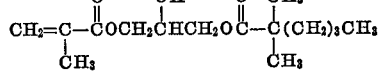

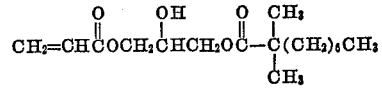

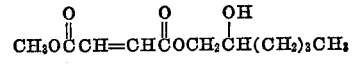

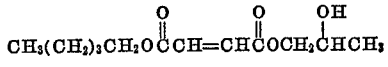

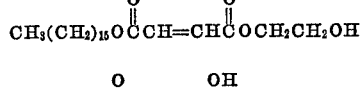

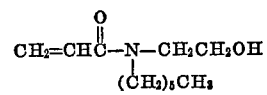

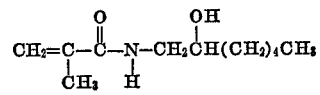

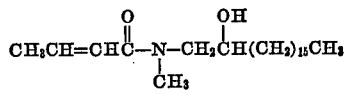

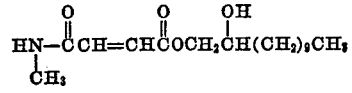

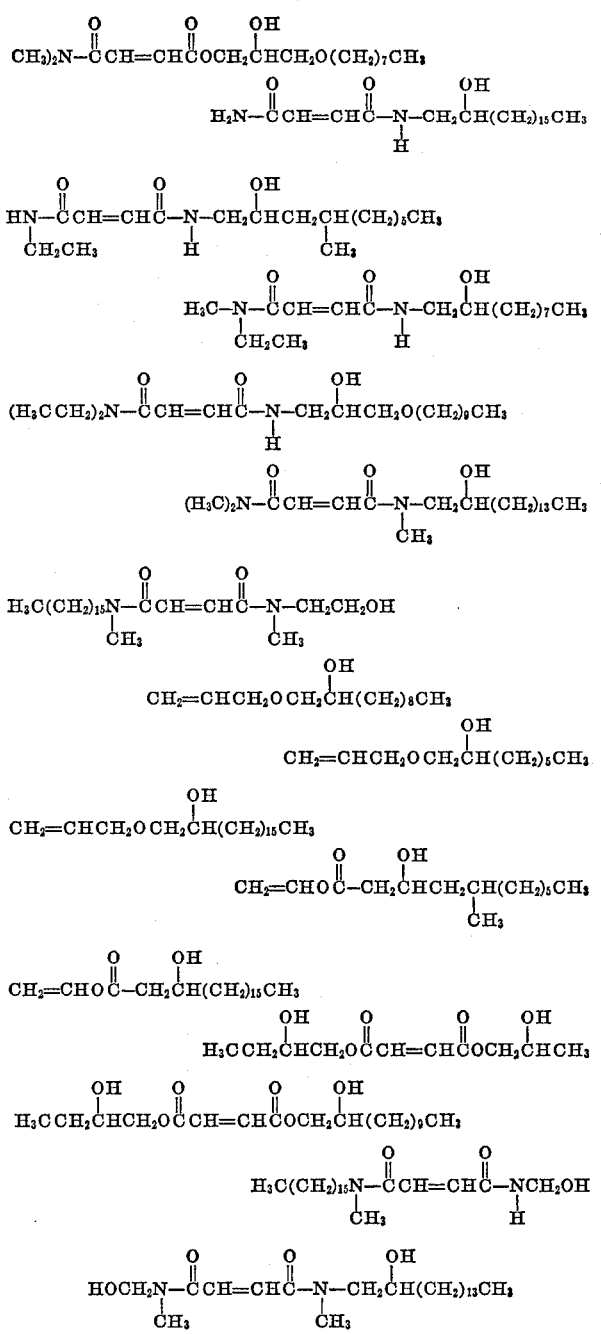

With reference to the third component general formula given hereinabove, preferred monomers are those wherein $R^1$ and $R^2$ are hydrogen, $R^3$ is either hydrogen or methyl, and X is either methyleneoxy or carbonyloxy. The most preferred compounds are the following:

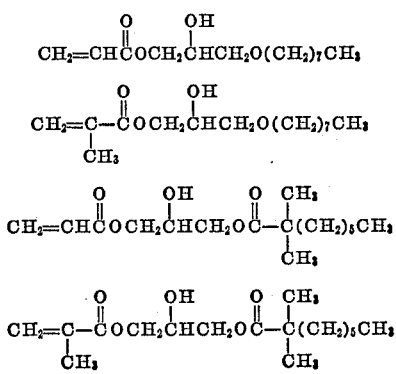

Said most preferred compounds generally can be prepared by known methods. A preferred procedure is as follows: Acrylic acid or methacrylic acid, 2000 p.p.m. of hydroquinone or similar inhibitor, 3–5 percent of a catalyst, such as mercaptoethyl ether, ethyl thioethanol, and triphenylphosphine, and ten percent of an equimolar (stoichiometric) amount of a suitable epoxy compound, such as glycidyl octyl ether, are charged to a suitable reactor and heated to about 90 degrees centigrade over a one-hour period. The remaining epoxy compound is added portion-wise, with stirring, over a two-to-three hour period and the reaction temperature maintained until an acid value less than 20 is obtained. The resultant reaction solution is cooled and used as is. Any residual acid must be taken into account in determining the amount of unsaturated aliphatic monocarboxylic acid to be utilized in preparing the dispersions of the present invention, in order to prepare a copolymer havng a given acid value.

Without the use of said third component, the dispersions, when cured with aminoplast resins, provide films which films are cloudy or hazy. Consequently, said third component imparts internal compatibility within the copolymers of the nonaqueous dispersions. In order to have any noticeable effect upon compatibility, said third component must be present in amounts greater than about one weight percent, based on the total amount of all monomers. Increasing the level of said third component increases the solubility of the resultant nonaqueous dispersion in the nonaqueous medium or dispersing phase. This increasing solubility results in increasing viscosity; hence, the upper limit of said third component is about 20 weight percent. The preferred limits, however, are from about five weight percent to about 15 weight percent; the most preferred limits are from about five to about ten weight percent.

As stated hereinbefore, the nonaqueous medium primarily is a liquid aliphatic hydrocarbon in which the dispersed phase is substantially insoluble. Said nonaqueous medium can be a single organic liquid or a mixture of two or more organic liquids. Although not preferred, the term "aliphatic" as applied to said nonaqueous medium is meant to include cycloaliphatic compounds. Furthermore, up to about 50 weight percent of said nonaqueous medium can be aromatic hydrocarbons, and less than about 20 weight percent of said nonaqueous medium can be polar solvents, such as aliphatic alcohols, esters, ethers, and ketones. However, the absence of polar solvents is both desirable and preferred. Furthermore, it is preferred that during the preparation of the dispersions of the present invention the nonaqueous medium contain no more that about 20 weight percent aromatic hydrocarbons. Afterwards, however, additional aromatic hydrocarbons can be added as desired.

Suitable liquid hydrocarbons include pentane, cyclopentane, hexane, cyclohexane, heptane, cycloheptane, octane, isooctane, 3-methyloctane, 4-ethylheptane, 2,6-dimethylheptane, nonane, decane, 2,7-dimethyloctane, hendecane, dodecane, tridecane, tetradecane, pentadecane, hexandecane, and the like. Also included are commercially-available hydrocarbon mixtures, such as mineral spirits, solvent naphthas, octane fractions, and the like. Aromatic hydrocarbons which can be present include benzene, toluene, xylene, xylene mixtures, and the like.

In general, the nonaqueous medium will have a boiling point of from about 60° C. to about 300° C. and will be composed of one or more compounds having fewer than about 17 carbon atoms but more than about four carbon atoms. The hydrocarbon liquids preferred for use in the present invention are aliphatic petroleum naphthas, commonly called VM & P naphthas. Consequently, the preferred hydrocarbon liquids have boiling points in the range of from about 90° C. to about 170° C.

In general, the amount of nonaqueous medium employed will be sufficient to provide from about 40 to about 65 weight percent solids in the final dispersion. At solids levels above about 65 weight percent, the dispersions tend to become grainy or seedy and exhibit high viscosities. While the dispersions of the present invention can be prepared quite readily with solids levels below about 40 weight percent, it usually is desired not to do so, in order to preserve the advantage of high solids.

The first step of the process by which the disclosed dispersions are prepared comprises partially polymerizing a portion of at least one of the carboxy-free vinyl monomers with all of the different hydroxy-containing ethylenically-unsaturated monomer, i.e., said third component, in the presence of at least some of the nonaqueous medium and a catalytic amount of a free-radical initiator. By "partially polymerizing," it is meant that the polymerization reaction is carried to a conversion ranging from about 60 to about 75 percent. At conversions below about 60 percent, viscosity problems arise. That is, as the conversion decreases, the viscosity of the final nonaqueous dispersion increases. This phenomenon appears to result from increased solubility of the dispersed phase in the nonaqueous medium. At conversions above about 75 percent, the dispersions obtained, although stable, are incompatible internally.

The primary consideration in the selection of both the kinds and amounts of carboxy-free vinyl monomers to be employed in said partial polymerization is that the product of said partial polymerization must be completely soluble in the nonaqueous medium. Furthermore, the solubility of said product in the nonaqueous medium must not be adversely affected by the monomers which remain at the conclusion of said partial polymerization. As a general rule, the monomers employed in said partial polymerization must comprise at least one monomer whose homopolymer is soluble in the nonaqueous medium, and preferably two or more such monomers. Monomers whose homopolymers are soluble in the nonaqueous medium can be exemplified by three types: (1) vinyl esters of monocarboxylic acids having eight or more carbon atoms; (2) alkyl esters of acrylic, methacrylic, and crotonic acids, wherein the alkyl moieties contain four or more carbon atoms, and (3) vinyl alkyl ethers, the alkyl portions of which contain four or more carbon atoms. The preferred monomers are those of the second type. Solvents and nonsolvents for various homopolymers are tabulated in J. Brandup and E. H. Immergut, Editors, "Polymer Handbook," Interscience Publishers, a division of John Wiley & Sons, New York, 1966, pp. IV–185 to IV–234.

Monomers whose homopolymers are either insoluble or only partly soluble in the nonaqueous medium can be employed in said partial polymerization, if desired, or required for certain cured film properties. However, the use of such monomers depends upon the selection of required monomers and the composition of the nonaqueous medium. In general, the more insoluble in the nonaqueous medium is the homopolymer of an optional monomer the lower is the amount of that monomer which can be employed without rendering the product of said partial polymerization at least slightly insoluble in the nonaqueous medium. By way of illustration of the foregoing, polystyrene generally is soluble in aromatic hydrocarbons, such as benzene and toluene, and insoluble in saturated aliphatic hydrocarbons. Since most, if not all, commercially-available aliphatic solvent mixtures contain varying amounts of aromatic hydrocarbons, the solubility of polystyrene in such solvents obviously is dependent upon the amount of aromatic hydrocarbons present.

As stated hereinbefore, said partial polymerization is carried out with from about 15 to about 80 weight percent of at least one of the carboxy-free vinyl monomers whose homopolymers are soluble in the nonaqueous medium, as described hereinbefore. If more than one such monomer is employed, it is not necessary that each monomer be employed in equal amounts in the partial polymerization step. For the reasons already enumerated, the amounts of monomers whose homopolymers are either insoluble or only partly soluble can vary from zero to 100 weight percent. The weight percentage of any given monomer, as used in reference to said partial polymerization step, is based upon the total amount of that monomer available. In general, the total amount of all monomers employed in said partial polymerization step can vary from about ten to about 50 weight percent, based on the total amount of all monomers; the preferred range is from about 20 to about 30 weight percent.

From the foregoing discussion of the partial polymerization step, it is apparent that said partial polymerization step is carried out in solution. Accordingly, at least some of the nonaqueous medium is mixed with the monomers to be polymerized and a catalytic amount of a free-radical initiator. It is desirable, and in fact preferable, to employ all of the nonaqueous medium in this first partial polymerization step. The resultant solution then is heated at a temperature of at least 50 degrees centigrade for a time sufficient to give a conversion in the range of from about 60 to about 75 percent. Usually the polymerization temperature will not exceed 150 degrees centigrade. A preferred polymerization temperature range is from about 90 to about 120 degrees centigrade. At such temperatures, polymerization times can vary from about 30 minutes to about three hours. In general, the optimum temperature for any given reaction is dependent upon the free-radical initiator employed.

Once the desired degree of conversion has been achieved, the remaining monomers and nonaqueous medium, if any, are added portion-wise over a period of from about 30 minutes to about three hours, preferably two hours. Heating is continued for a time sufficient to give substantially complete conversion, which time can vary from about one to about 12 hours, with from four to eight hours being preferred. The resultant dispersion usually is uniform, stable, and smooth, being free of grains or seeds. If desired, however, the dispersion can be strained.

Suitable free-radical initiators are those well known to persons skilled in the art. Examples of such initiators include, among others, cumeme hydroperoxide, t-butyl perbenzoate, methyl ethyl ketone peroxide, cyclohexanone peroxide, di-t-butyl peroxide, 2,4-dichlorobenzoyl peroxide, lauroyl peroxide, caprylyl peroxide, azobisisobutyronitrile, acetyl peroxide, benzoyl peroxide, p-chlorobenzoyl peroxide, t-butyl peroxyisobutyrate, and t-butyl peroctoate. The preferred free-radical initiator is di-t-butyl peroxide.

The amount of catalyst, i.e., free-radical initiator, employed can vary from about 0.1 to about 5.0 weight percent, based on total monomers. Preferably, said catalyst will be employed in the range of from about 0.25 to about 2.0 weight percent. While it is preferred that a single catalyst be employed, two or more such catalysts can be used, either singly or as a mixture.

The nonaqueous dispersions of the present invention, when combined with aminoplast resin curing agents, are especially useful in the preparation of industrial finishes, automotive finishes in particular. Suitable aminoplast resins in general are alkylated amine-formaldehyde condensates which can be monomeric or polymeric in nature, or both. While the preferred amine is melamine, other amines can be utilized to prepare suitable alkylated amine-formaldehyde condensates and include urea, ethyleneurea, guanamine, benzoguanamine, and the like. A detailed discussion of aminoplast resins can be found in H. F. Payne, "Organic Coating Technology," vol. I, John Wiley & Sons, Inc., New York, 1954, pp. 326–350. The preferred use of aminoplast resin curing agents as described hereinabove is not to be construed as precluding the use of other curing agents, such as blocked polyisocyanates.

The amount of aminoplast resin which can be employed generally can vary from about ten to about 50 weight percent, based on total dispersion and aminoplast resin solids. Preferably, from about 20 to about 30 weight percent of aminoplast resin will be used.

Without intending to limit it in any manner, the present invention will be more fully described by the following examples which illustrate certain preferred embodiments. Unless otherwise indicated, all percentages and parts are by weight.

EXAMPLE 1

A five-liter, round-bottomed flask was equipped with a stirrer, nitrogen inlet, condenser, thermometer, and addition funnel, and charged with 256.2 grams of butyl methacrylate, 267 grams of butyl acrylate, 80.1 grams of styrene, 36 grams of the adduct, which had an acid value of 38, of methacrylic acid with an alkyl glycidyl ether having a weight per epoxide of about 237, the alkyl groups of which were predominantly n-octyl and n-decyl, 1472.4 grams of VM & P naphtha, and 47.4 grams of di-t-butyl peroxide. While slowly purging with nitrogen the reaction solution was heated over a period of about one hour to a temperature of about 120 degrees centigrade and maintained at that temperature for 1.25 hours, at the end of which time the nonvolatiles content of the reaction solution was 21 weight percent, indicating 66 percent conversion. By means of the addition funnel, the remaining reactants were added to the flask over a period of about two hours, which reactants consisted of 300.6 grams of methyl methacrylate, 80.1 grams of styrene, 170.4 grams of butyl methacrylate, 177.6 grams of butyl acrylate, and 432 grams of hydroxypropyl methacrylate, which reactants were premixed to form a homogenous solution. During this addition, the reaction temperature was maintained at 110–120 degrees centigrade. At the completion of the addition, the nonvolatiles content was 42 percent. Heating at 110–120 degrees centigrade was continued for about six hours, at the end of which time the nonvolatiles content was 57 percent (theoretical nonvolatiles content, exclusive of catalyst, was 55 percent). The resultant dispersion had a nonvolatiles content of 54 percent and a Brookfield viscosity (spindle No. 1 at 25 degrees centigrade) of 165 cps.; the dispersion solids had an acid value of 6. The dispersion was stable at room temperature for 90 days.

An approximately three-mil wet film of the dispersion was drawn down on glass, dried in air for 30 minutes, then baked at 250 degrees Fahrenheit for 30 minutes. A clear film resulted.

To 70 parts, based on solids, of the dispersion of Example 1 was added 30 parts of a liquid hexamethoxymethylmelamine. Approximately three-mil wet films of the resultant stable dispersion were drawn down on glass and Bonderite 1000 panels and cured at 250 degrees Fahrenheit for 20 minutes. The film on the glass panel was slightly cloudy. The film on the Bonderite 1000 panel had excellent xylene spot resistance and a pencil hardness of F.

Xylene spot resistance was determined by placing a drop of xylene on the film and wiping the xylene off at the end of 60 seconds. A rating of excellent means that there was no observable effect on the film. A rating of good means that the film was unbroken but marked. If the film were marked and unbroken, but could be rubbed off of the panel, the rating was fair. A rating of poor was given when the film was either dissolved or lifted off of the panel by the xylene.

EXAMPLE 2

The procedure of Example 1 was repeated, except that (1) the initial charge consisted of 1419 parts of VM & P naphtha, 54 parts of di-t-butyl peroxide, 90 parts of the adduct, which had an acid value of 50, of methacrylic acid with the glycidyl esters of a mixture of 2,2-di-methyl-substituted aliphatic monocarboxylic acids having from nine to 11 carbon atoms, including the substitution, 36 parts of lauryl methacrylate, 207 parts of butyl methacrylate, 207 parts of butyl acrylate, and 81 parts of styrene, (2) the mixture of remaining monomers consisted of 459 parts of methyl methacrylate, 216 parts of butyl methacrylate, 144 parts of butyl acrylate, 338 parts of hydroxypropyl methacrylate, and 22 parts of methacrylic acid, (3) the addition time of the remaining monomers was reduced to one hour, and (4) the hold time after addition of the remaining monomers was increased to about seven hours. The resultant white, stable dispersion had a solids content of 55 weight percent, a solids acid value of 16, and a Brookfield viscosity at 25° C. of 375 cps.

The dispersion of Example 2 was combined with curing agent and evaluated as described in Example 1. Similar results were obtained, except that the cured film on glass was clear.

EXAMPLE 3

The procedure of Example 1 was repeated, except that (1) the initial charge consisted of 1425 parts of VM & P naphtha, 48 parts of di-t-butyl peroxide, 126 parts of an adduct similar to that of the adduct of Example 1 and having an acid value of 18, 76 parts of styrene, 243 parts of butyl methacrylate, and 253 parts of butyl acrylate, (2) the mixture of remaining monomers consisted of 286 parts of methyl methacrylate, 76 parts of styrene, 27 parts of methacrylic acid, 162 parts of butyl methacrylate, 168 parts of butyl acrylate, and 383 parts of hydroxypropyl methacrylate, and (3) the hold time after addition of the remaining monomers was increased to about seven hours. The resultant dispersion was white, stable, had a solids content of 54 weight percent, a solids acid value of 17, and a Brookfield viscosity at 25 degree centigrade of 1500 cps.

The dispersion of Example 3 was combined with curing agent and evaluated as described in Example 1. The cured film on glass was slightly cloudy and the film on Bonderite 1000 had good xylene spot resistance and a pencil hardness of HB.

EXAMPLE 4

The procedure of Example 1 was repeated, except that (1) the initial charge consisted of 1425 parts of VM & P naphtha, 48 parts of di-t-butyl peroxide, 126 parts of an adduct essentially the same as that employed in Example 3, 76 parts of styrene, 243 parts of isobutyl methacrylate; and 253 parts of butyl acrylate, (2) the mixture of remaining monomers consisted of 364 parts of methyl methacrylate, 450 parts of styrene, 30 parts of methacrylic acid, and 258 parts of hydroxypropyl methacrylate, and (3) the hold time after addition of the remaining monomers was increased to about nine hours. The resultant stable, white dispersion had a solids content of 53 weight percent, a solids acid value of 16, and a Brookfield viscosity at 25 degrees centigrade of 1500 cps.

The dispersion of Example 4 was combined with curing agent and evaluated as described in Example 1. The cured film on glass was slightly cloudy and the film on Bonderite 1000 had fair xylene spot resistance and a pencil hardness of B.

EXAMPLE 5

The procedure of Example 3 was repeated, except that the styrene in the initial charge was replaced with an equal amount of methyl methacrylate, and the hold time after addition of the remaining monomers was increased to about nine hours. The resultant stable, white dispersion had a solids content of 54 weight percent, a solids acid value of 17, and a Brookfield viscosity at 25 degrees centigrade of 3900 cps.

The dispersion of Example 5 was combined with curing agent and evaluated as described in Example 1. The results obtained were similar to those obtained using the dispersion of Example 4, except that xylene spot resistance of the cured film on Bonderite 1000 was good.

EXAMPLE 6

The procedure of Example 1 was repeated, except that (1) the initial charge consisted of 1419 parts of VM & P naphtha, 54 parts of di-t-butyl peroxide, 90 parts of the adduct of Example 2, 78 parts of styrene, 248 parts of butyl methacrylate, and 258 parts of butyl acrylate, (2) the mixture of remaining monomers consisted of 370 parts of methyl methacrylate, 165 parts of butyl methacrylate, 172 parts of butyl acrylate, 35 parts of methacrylate acid, and 384 parts of hydroxypropyl methacrylate, and (3) the hold time after addition of the remaining monomers was reduced to about three hours. The resultant white, stable dispersion had a solids content of 54 weight percent, a solids acid value of 20, and a Brookfield viscosity at 25 degrees centigrade of 715 cps.

The dispersion of Example 6 was combined with curing agent and evaluated as described in Example 1. The results obtained were similar to those obtained using the dispersion of Example 4, except that the cured film on glass was clear.

EXAMPLE 7

The procedure of Example 1 was repeated, except that (1) the initial charge consisted of 1425 parts of VM & P naphtha, 48 parts of di-t-butyl peroxide, 180 parts of the adduct employed in Example 4, 33 parts of styrene, 53 parts of butyl methacrylate, 55 parts of butyl acrylate, and 107 parts of isobutyl methacrylate, (2) the mixture of remaining monomers consisted of 345 parts of methyl methacrylate, 98 parts of styrene, 215 parts of butyl methacrylate, 221 parts of butyl acrylate, 475 parts of hydroxypropyl methacrylate, and 18 parts of methacrylic acid, and (3) the hold time after addition of the remaining monomers was decreased to about five hours. The resulting stable, white dispersion had a solids content of 54 weight percent, a solids acid value of 14, and a Brookfield viscosity at 25° C. of 14,120 cps.

The dispersion of Example 7 was combined with curing agent and evaluated as described in Example 1. Similar results were obtained, except that the cured film on glass was clear and the cured film on the Bonderite 1000 panel had a pencil hardness of F–H and a Sward hardness of 16–18 rocks.

EXAMPLE 8

A medium-blue metallic automotive topcoat was prepared as follows: A pigment paste was prepared by mixing (a) 1.42 parts of a slurry consisting of 20 weight percent aluminum flake, 25 weight percent Solvesso 100, a 95-percent aromatic solvent mixture having a boiling point range of 315–355° F., and 55 weight percent of a 60 weight percent solids solution of a butylated melamine-formaldehyde resin in 1:1 xylol:butanol, having a medium tolerance for mineral spirits, referred to hereinafter as MF resin solution, (b) 9.00 parts of a dispersion of 7.5 weight percent of phthalocyanine green in 2.5 weight percent Solvesso 100 and 90 weight percent of MF resin solution, (c) 2.00 parts of a dispersion of 20 weight percent Hilton-Davis yellow oxide in 20 weight percent Solvesso 100 and 60 weight percent MF resin solution, and (d) 2.00 parts of a dispersion of 20 weight percent Hilton-Davis red oxide in 20 weight percent Solvesso 100 and 60 weight percent MF resin solution. The pigment paste, 14.42 parts, then was added to a mixture of 6.50 parts of MF resin solution, 0.20 part of a 30 weight percent solution of tetrachlorophthalic anhydride in xylol, 6.58 parts of VM & P naphtha, 18.07 parts of Solvesso 100, and 54.20 parts of the nonaqueous dispersion of Example 3. The resultant mixture had a viscosity of about 30 seconds on a #4 Ford cup. The mixture was thinned to a viscosity of 17 seconds by adding about 20 percent by volume of a 1:1 Solvesso 100:VM & P naphtha mixture, giving a sprayable automotive topcoat.

The topcoat of Example 8 was applied to primed panels by spraying; the panels were cured for 30 minutes at 250° F. The cured coatings exhibited good humidity resistance, good xylol and gasoline spot resistance, and excellent gloss. Film Sward hardness was under 16 rocks.

EXAMPLE 9

The procedure of Example 8 was repeated, except that the nonaqueous dispersion of Example 3 was replaced with an equal amount of the nonaqueous dispersion of Example 7. The resulting topcoat was evaluated as described in Example 8; the cured film had similar properties, except that gloss was reduced slightly and Sward hardness was increased to 16–18 rocks.

It is to be understood that the foregoing detailed description is given merely by way of illustration and that many variations may be made therein without departing from the spirit of the invention.

Having thus disclosed the invention, what is claimed is:

1. A process for preparing a nonaqueous dispersion of a hydroxy-containing copolymer, which comprises the steps of:
   (a) copolymerizing in a nonaqueous medium (i) from about 15 to about 80 weight percent of the total amounts available of one or more ethylenically unsaturated carboxy-free and hydroxy-free monomers whose homopolymers are soluble in said nonaqueous medium with (ii) a hydroxy-containing ethylenically-unsaturated monomer, in the presence of a catalyst which is a free-radical initiator and at a temperature of from about 50 to about 150° C. for a time sufficient to achieve from about 60 to about 75 percent conversion;
   (b) adding to the resulting polymerization solution at the polymerization temperature a mixture of (i) the remaining amounts of (a), (i), (ii) a hydroxyalkyl ester of an unsaturated aliphatic monocarboxylic acid, and optionally (iii) one or more ethylenically-unsaturated monomers different from those employed in step (a), (iv) additional nonaqueous medium, and (v) additional catalyst; and
   (c) holding at the polymerization temperature for a time sufficient to achieve essentially complete conversion;
wherein
   (1) a(i) are selected from the group consisting of (a) vinyl esters of monocarboxylic acids having eight or more carbon atoms, (b) alkyl esters of acrylic, methacrylic, and crotonic acids, wherein the alkyl moieties contain four or more carbon atoms, and (c) vinyl alkyl ethers, the alkyl portions of which contain four or more carbon atoms;
   (2) a(ii) is represented by the general formula,

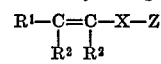

wherein $R^1$ is a monovalent radical selected from the group consisting of hydrogen, methyl, alkoxycarbonyl, hydroxyalkoxycarbonyl, amido, N-alkylamido, and N,N-dialkylamido; $R^2$ and $R^3$ independently are either hydrogen or methyl; at least two of $R^1$, $R^2$, and $R^3$ are hydrogen; X is a divalent radical selected from the group consisting of methyleneoxy, carbonyloxy, oxycarbonyl, carbonylimino, and carbonyl(alkylimino); Z is a monovalent radical selected from the group consisting of radicals having the following general formulae, except that when X is oxycarbonyl, Z shall be $R^8$:

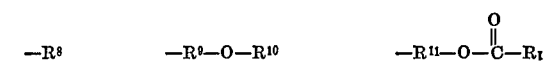

wherein $R^8$, $R^9$ and $R^{11}$ independently are hydroxyalkyl containing from 2 to about 20 carbon atoms, and $R^{10}$ and $R^{12}$ independently are alkyl containing from 1 to about 20 carbon atoms; and the total number of carbon atoms in any given monomer is in the range of from 11 to about 24;
   (3) the amount of a(ii) employed is in the range of from one to 20 weight percent;

(4) the monocarboxylic acid portion of b(ii) is selected from the group consisting of acrylic acid, methacrylic acid, crotonic acid, and half esters of maleic and fumaric acids wherein the ester moieties are saturated, aliphatic, and contain from one to four carbon atoms;

(5) the amount of b(ii) employed is in the range of from one to 75 weight percent; and (6) the total amount of a(i), and b(iii) if employed, is in the range of from five to 98 weight percent, the total of a(i), and b(iii) if employed, a(ii), and b(ii), being 100 weight percent; and (7) said nonaqueous medium comprises one or more liquid aliphatic hydrocarbons and from zero to about 50 weight percent of aromatic hydrocarbons.

2. The process of claim 1, wherein b(iii) includes a polymerizable unsaturated aliphatic monocarboxylic acid.

3. The process of claim 2, wherein said acid is selected from the group consisting of acrylic acid, methacrylic acid, crotonic acid, and half esters of maleic and fumaric acids wherein the ester moieties are saturated, aliphatic, and contain from one to about ten carbon atoms.

4. The process of claim 3, wherein said acid is in an amount in the range of from about 0.15 to about ten weight percent.

5. The process of claim 4, wherein said acid is methacrylic acid.

6. The process of claim 1, wherein the polymerization temperature is in the range of from about 90 to about 120 degrees centigrade.

7. The process of claim 1, wherein said catalyst is present in an amount which varies from about 0.1 to about 5.0 weight percent, based on total monomers.

8. The process of claim 7, wherein said catalyst is di-t-butyl peroxide.

9. The process of claim 1, wherein a(i) and b(iii) are butyl acrylate, methyl methacrylate, a butyl methacrylate, and styrene.

10. The process of claim 1, wherein b(ii) is hydroxypropyl methacrylate.

11. The process of claim 1, wherein, in the general formula for a(ii), $R^1$ and $R^2$ are hydrogen, $R^3$ is selected from the group consisting of hydrogen and methyl, and X is selected from the group consisting of methyleneoxy and carbonyloxy.

12. The process of claim 11, wherein a(ii) is the adduct of a monocarboxylic acid selected from the group consisting of acrylic acid and methacrylic acid with an epoxy compound selected from the group consisting of glycidyl alkyl ethers and glycidyl esters of saturated aliphatic monocarboxylic acids.

13. The process of claim 1, wherein a(i) and b(iii) are butyl acrylate, methyl methacrylate, a butyl methacrylate, styrene, and methacrylic acid; b(ii) is hydroxy propyl methacrylate; and a(ii) is selected from the group consisting of the adduct of methacrylic acid with glycidyl n-octyl ether and the aduct of methacrylic acid with the glycidyl esters of a mixture of 2,2-dimethyl-substituted aliphatic monocarboxylic acids having a total of from 9 to 11 carbon atoms.

References Cited
UNITED STATES PATENTS

| | | | |
|---|---|---|---|
| Re. 27,151 | 6/1971 | Hicks | 260—47 UP |
| 3,261,788 | 7/1966 | Carter et al. | 260—33.6 R |
| 3,317,635 | 5/1967 | Osmond | 260—34.2 |
| 3,365,414 | 1/1968 | Fisk et al. | 260—34.2 |
| 3,607,821 | 9/1971 | Clarke et al. | 260—33.6 UA |
| 3,661,835 | 5/1972 | Baker et al. | 260—34.2 |

ALLAN LIEBERMAN, Primary Examiner

U.S. Cl. X.R.

260—33.6 R, 34.2

UNITED STATES PATENT OFFICE
CERTIFICATE OF CORRECTION

Patent No. 3,745,137             Dated July 10, 1973

Inventor(s) Carroll G. Reid, Darrell D. Hicks & Charles D. Green

It is certified that error appears in the above-identified patent and that said Letters Patent are hereby corrected as shown below:

In column 1, line 21, delete "polymerzing" and insert -- polymerizing --. In column 14, line 67, delete "$-R^{11}-O-\overset{O}{\underset{\|}{C}}-R_1$" and insert -- $-R^{11}-O-\overset{O}{\underset{\|}{C}}-R^{12}$ --.

Signed and sealed this 1st day of January 1974.

(SEAL)
Attest:

EDWARD M. FLETCHER, JR.        RENE D. TEGTMEYER
Attesting Officer                Acting Commissioner of Patents